US007035728B2

(12) United States Patent
Manzone et al.

(10) Patent No.: US 7,035,728 B2
(45) Date of Patent: Apr. 25, 2006

(54) DRIVE DEVICE FOR INDUCTIVE ELECTROACTUATORS

(75) Inventors: Alberto Manzone, Alba (IT); Paolo Santero, Orbassano (IT); Riccardo Groppo, Roletto (IT)

(73) Assignee: C.R.F. Societa Consortile per Azioni, Orbassano (IT)

( * ) Notice: Subject to any disclaimer, the term of this patent is extended or adjusted under 35 U.S.C. 154(b) by 0 days.

(21) Appl. No.: 10/989,725

(22) Filed: Nov. 17, 2004

(65) Prior Publication Data

US 2005/0146805 A1 Jul. 7, 2005

(30) Foreign Application Priority Data

Nov. 25, 2003 (IT) .......................... TO2003A0938

(51) Int. Cl.
*G11B 15/18* (2006.01)

(52) U.S. Cl. ...................................................... 701/103

(58) Field of Classification Search ................ 701/103, 701/102, 115

See application file for complete search history.

(56) References Cited

U.S. PATENT DOCUMENTS 5,162,998 A * 11/1992 Kondo ........................ 701/93

FOREIGN PATENT DOCUMENTS

EP 0 117 235 A1 * 8/1984

* cited by examiner

*Primary Examiner*—Hieu T. Vo
(74) *Attorney, Agent, or Firm*—Berenato, White & Stavish

(57) ABSTRACT

A drive device for inductive electroactuators equipped with a power circuit comprising a drive circuit for each electroactuator; each drive circuit comprising a series of selectively controlled transistors for regulating the current flowing through the electroactuator; a control circuit which is capable of driving the operation of each control circuit and a series of control modules, each of which controls the transistors of an associated control circuit; and a memory having at least two memory areas each storing the same operating parameters for the drive circuits; an internal microcontroller for reading the operating parameters; and a series of pointer registers which cooperate with the internal microcontroller and with an external microcontroller to define access of the external microcontroller to one of the memory areas and simultaneously to define access of the internal microcontroller to the other memory area, and to swap the access rights of the internal microcontroller and of the external microcontroller to the two memory areas.

10 Claims, 4 Drawing Sheets

DRIVE DEVICE FOR INDUCTIVE ELECTROACTUATORS

BACKGROUND OF THE INVENTION

1. Field of the Invention

The present invention relates to a drive device for inductive electroactuators.

In particular, the present invention is advantageously, but not exclusively, used for driving electrical injectors of a fuel injection system for a motor vehicle internal combustion engine, in particular for a common rail fuel injection system for a diesel engine, to which the following explanation will make explicit reference, without consequently restricting the general scope thereof.

The drive device according to the invention may nevertheless be used for other kinds of engines, such as petrol, methane or LPG engines, or for any other kind of inductive electroactuators, such as for example solenoid valves for ABS systems and the like, solenoid valves for variable timing systems, etc.

2. Description of the Related Art

As is known, it is conventional when driving the electrical injectors of a common rail fuel injection system to supply each electrical injector with a current, the time profile of which comprises a rapidly rising section up to a first holding value, a first oscillating amplitude section around the first holding value, a first falling section down to a second holding value, a second oscillating amplitude section around the second holding value and a second rapidly falling section down to a value of approximately zero.

As is indeed known, an electrical injector comprises an external body defining a cavity which communicates with the outside through an injection jet and in which there is accommodated an axially mobile pin to open and close the jet under the opposing axial thrusts of the pressure of the injected fuel, on the one hand, and of a spring and a rod, on the other, said rod being arranged along the axis of the plunger on the opposite side of the jet and being actuated by an electromagnetically driven metering valve.

During the initial opening phase of the electrical injector, not only must an appreciable force be exerted against the action of the spring, but the rod must be moved from the resting position to the actuation position in the fastest possible time. It is for this reason that the electromagnet excitation current in the initial phase is rather high (first holding value). The rapid rise in the current profile to the first holding value is necessary to ensure sufficient timing accuracy with regard to the moment of onset of actuation. Once the rod has reached the final position, however, the electrical injector still remains open with lower currents, hence the falling section and holding section around the second holding value in the electromagnet excitation current profile.

Said excitation current profile has in the past been obtained by using a drive device in which the electrical injectors were connected, on the one hand, directly to a supply line and, on the other, to a ground line through a controlled electronic switch.

However, said drive device exhibited the disadvantage that any short circuit to ground of one of the terminals of any of the electrical injectors, for example due to a loss of insulation on a cable conductor of the said electrical injectors and contact of said conductor with the motor vehicle's bodywork, resulted in permanent damage to the electrical injector itself and/or to the drive device, so causing the motor vehicle to shut down, which is highly hazardous when it is in motion.

In order to overcome this hazardous disadvantage, a drive device has been proposed in European Patent EP 0 924 589 in the name of the present applicant in which the electrical injectors are floating with regard to the supply lines, i.e. they are connected to the supply line and to the ground line through respective controlled electronic switches. In this manner, any short circuit to ground or to the supply of one of the terminals of the electrical injectors does not damage the electrical injector and thus does not cause the motor vehicle to shut down, but simply puts this single electrical injector out of service, the vehicle being capable of continuing in operation with one less electrical injector.

In the drive device described in the above-mentioned patent, the elevated voltage necessary to bring about the rapid rise in current in the initial opening phase of the electrical injector is generated by means of a boost circuit which is capable of raising the voltage supplied by the motor vehicle battery and essentially consists of a DC-DC converter.

It is also known that one of the approaches which is being pursued to improving the performance of and reducing the emissions from engines, in particular diesel engines equipped with a common rail fuel injection system, is that of increasing the fuel injection pressure, for example up to values of 1800 bar.

The most immediate consequence of this increase in pressure is an increase in the force exerted by the spring in order to counterbalance the pressure of the fuel and keep the electrical injector closed; it will consequently be necessary to exert a greater force on the rod of an electrical injector in order to overcome the action of the spring. In order to be able to increase the force exerted by the electromagnet, without having to change current levels, the number of turns and thus the inductance of the electromagnet is increased.

This results in an increase in the energy $E=\frac{1}{2}\cdot L\cdot I^2$ (and thus of the power) which must be supplied by the boost circuit during the initial control phase of the electrical injector, during which the current rises rapidly.

However, given that the DC-DC converter is dimensioned in accordance with the power which can be supplied to the electrical injector and, in particular, that the dimensions of the DC-DC converter increase as a function of the power it is desired to obtain from the output of the said DC-DC converter, raising the fuel injection pressure would entail the use of a DC-DC converter of considerably larger dimensions than that presently used, with a consequent increase in the area occupied by the DC-DC converter, the overall bulk of the drive device and the associated costs.

In order to overcome the problem associated with the overall bulk of the DC-DC converter and thus of the drive device for the electrical injectors, a voltage boost circuit has recently been developed which is made up of a single capacitor, the circuit being capable of recharging said capacitor using one or more electrical injectors which are non-operational, i.e. not involved in a fuel injection operation.

In particular, at the moment at which it is decided to recharge the capacitor of the voltage boost circuit, an electrical injector is first of all identified which at that moment is not involved in a fuel injection operation, electrical energy is then stored in said electrical injector and finally the stored electrical energy is transferred from the electrical injector to the capacitor of the voltage boost circuit.

The storage of electrical energy in one of the electrical injectors not involved in a fuel injection operation and the transfer of said stored energy to the capacitor of the voltage boost circuit are achieved by using the drive device shown in the example of FIG. 1, said device comprising a power circuit, designated 10 overall, which in turn comprises a plurality of drive circuits 11, one for each electrical injector 12; and a control circuit (not shown) capable of controlling the operation of each drive circuit 11.

For simplicity's sake, FIG. 1 shows two drive circuits 11 associated with two respective electrical injectors 12 belonging to the same cylinder bank of the engine (not shown), each of which injectors is shown in the Figure with its corresponding equivalent circuit made up of a resistor and an inductor connected in series. Each drive circuit 11 comprises a first and a second input terminal 13, 14, connected to the positive pole and the negative pole of the motor vehicle's battery 23, said battery supplying a voltage $V_{BATT}$, the nominal value of which is typically 12 V; a third and a fourth input terminal 15, 16, connected to a first and a second output terminal of a boost circuit 8 which is common to all the drive circuits 11, between which it supplies a boosted voltage $V_{BOOST}$ greater than the battery voltage $V_{BATT}$, for example 50 V; and a first and a second output terminal 19, 20, between which is connected the associated electrical injector 12.

The terminal of each electrical injector 12 connected to the first output terminal 19 of the associated drive circuit 11 is typically known as the "high" or "hot" side terminal, while the terminal of each electrical injector 12 connected to the second output terminal 20 of the associated drive circuit 11 is typically known as the "low" or "cold" side terminal.

In its simplest embodiment, the boost circuit 8 is made up of a single, "boost" capacitor 21, connected between the first and the second output terminal of the boost circuit 8, and across which is connected a comparator stage with hysteresis 22 which outputs a logic signal which assumes a first logic level, for example high, when the voltage across the capacitor 21 is greater than a predetermined upper value, for example 50 V, and a second logic level, for example low, when the voltage across the capacitor 21 is less than a predetermined lower value, for example 49 V.

Each drive circuit 11 moreover comprises a ground line 24 connected to the second input terminal 14 and to the fourth input terminal 16, and a supply line 25 connected, on the one hand, to the first input terminal 13 through a first diode 26, the anode of which is connected to the first input terminal 13 and the cathode of which is connected to the supply line 25, and, on the other, to the third input terminal 15 through a first MOS transistor 27, which has the gate terminal capable of receiving a first control signal from the control circuit (not shown), a well terminal connected to the third input terminal 15, and the source terminal connected to the supply line 25.

Each drive circuit 11 moreover comprises a second MOS transistor 28 having a gate terminal receiving a second control signal supplied by the control circuit (not shown), a well terminal connected to the supply line 25, and a source terminal connected to the first output terminal 19; and a third MOS transistor 29 having a gate terminal receiving a third control signal supplied by the control circuit (not shown), a well terminal connected to the second output terminal 20, and a source terminal connected to the ground line 24 through a sensing stage made up of a sense resistor 31 across which there is connected an operational amplifier 32 generating an output voltage $V_S$ proportional to the current flowing in said sense resistor 31.

Each drive circuit 11 moreover comprises a second, "free-wheeling" diode 33 with the anode connected to the ground line 24 and the cathode connected to the first output terminal 19; and a third, "boost" diode 34 with the anode connected to the second output terminal 20 and the cathode connected to the third input terminal 15.

The operation of each drive circuit 11 may be subdivided into three main distinct phases characterised by a different profile of the current flowing in the electrical injector 12: a first, rapid charging or "boost" phase, in which the current rises rapidly up to a holding value capable of opening the electrical injector 12; a second, holding phase, in which the current oscillates with a sawtooth profile around the value reached in the preceding phase; and a third, rapid discharge phase, in which the current falls rapidly from the value assumed in the preceding phase to a final value, which may also be zero.

In particular, in the rapid charging phase, the control circuit causes the transistors 27, 28 and 29 to close and the boosted voltage $V_{BOOST}$ is thus applied across the electrical injector 12. In this manner, the current flows in the network comprising the capacitor 21, the transistor 27, the transistor 28, the electrical injector 12, the transistor 29 and the sense resistor 31, rising over time in substantially linear manner with a gradient equal to $V_{BOOST}/L$ (where L represents the equivalent series inductance of the electrical injector 12). Since $V_{BOOST}$ is much higher than $V_{BATT}$, the current rises much more rapidly than could be achieved with $V_{BATT}$.

In the holding phase, transistor 29 is closed, transistor 27 is open and transistor 28 is repeatedly closed and opened and the battery voltage $V_{BATT}$ (when transistor 28 is closed) and a zero voltage (when transistor 28 is open) are thus applied alternately across the electrical injector 12. In the first case (transistor 28 closed), current flows in the network comprising the battery 23, the diode 26, the transistor 28, the electrical injector 12, the transistor 29 and the sense resistor 31, rising exponentially over time, while in the second case (transistor 28 open), current flows in the network comprising the electrical injector 12, the transistor 29, the sense resistor 31 and the free-wheeling diode 33, falling exponentially over time.

Finally, in the rapid discharge phase, the control circuit causes the transistors 27, 28 and 29 to open, while current is passing through the electrical injector 12, the boosted voltage $-V_{BOOST}$ being applied across the electrical injector 12. In this manner, current flows in the network comprising the capacitor 21, the boost diode 34, the electrical injector 12 and the free-wheeling diode 33, falling over time in substantially linear manner with a gradient equal to $-V_{BOOST}/L$. Since $V_{BOOST}$ is much higher than $V_{BATT}$, the current falls much more rapidly than could be achieved with $V_{BATT}$. In this phase, the electrical energy stored in the electrical injector 12 (equal to $E=\frac{1}{2}\cdot L\cdot I^2$) is transferred to the capacitor 21, in such a manner as to allow the recovery of a proportion of the energy supplied by the drive circuit 11 during the rapid charging phase, so increasing the efficiency of the system. On the basis of calculations, it has been found that the percentage energy recovery associated with said phase may be at most around 25% (depending on the type of electrical injector, the materials used and the mechanical work performed by the electromagnet to move the rod).

The control signals for the above-stated transistors 27, 28 and 29 are generated by the control circuit on the basis of operating parameters stored in a memory integral with the said control device.

These operating parameters are normally updated in line with any changes in the engine operating conditions and it could happen that the control signals are generated while the operating parameters are being updated, i.e. when only some of the operating parameters have been updated.

In this situation, the above-stated control signals would be generated on the basis of non-homogeneous operating parameters, i.e. which do not relate to a single set of engine operating conditions, and this may result in the electroactuators being actuated in a manner which is inappropriate for current engine operating conditions.

SUMMARY OF THE INVENTION

The object of the present invention is thus to provide a drive device for inductive electrical injectors which overcomes the above-described disadvantages.

The present invention provides a drive device for inductive electroactuators equipped with a power circuit comprising a drive circuit for each electroactuator; each drive circuit comprising selectively controlled switching means for regulating the current flowing through said electroactuator; said drive device moreover comprising a control circuit which is capable of driving the operation of each control circuit of said power circuit and being characterised in that said control circuit comprises:

- a series of control modules, each of which controls said switching means of an associated control circuit, and comprises memory means having at least two memory areas each storing the same operating parameters for said drive circuits; reading means for the operating parameters; and pointer means which cooperate with said reading means and with writing means for the operating parameters in order to define access of said writing means to one of said memory areas, and simultaneously to define access of said reading means to the other of said memory areas, and to swap the access rights of said writing means and of said reading means to said memory areas.

BRIEF DESCRIPTION OF THE DRAWINGS

The present invention will now be described with reference to the attached drawings, which illustrate a non-limiting embodiment of the invention, in which.

DETAILED DESCRIPTION OF THE PREFERRED EMBODIMENTS

Figure 2:
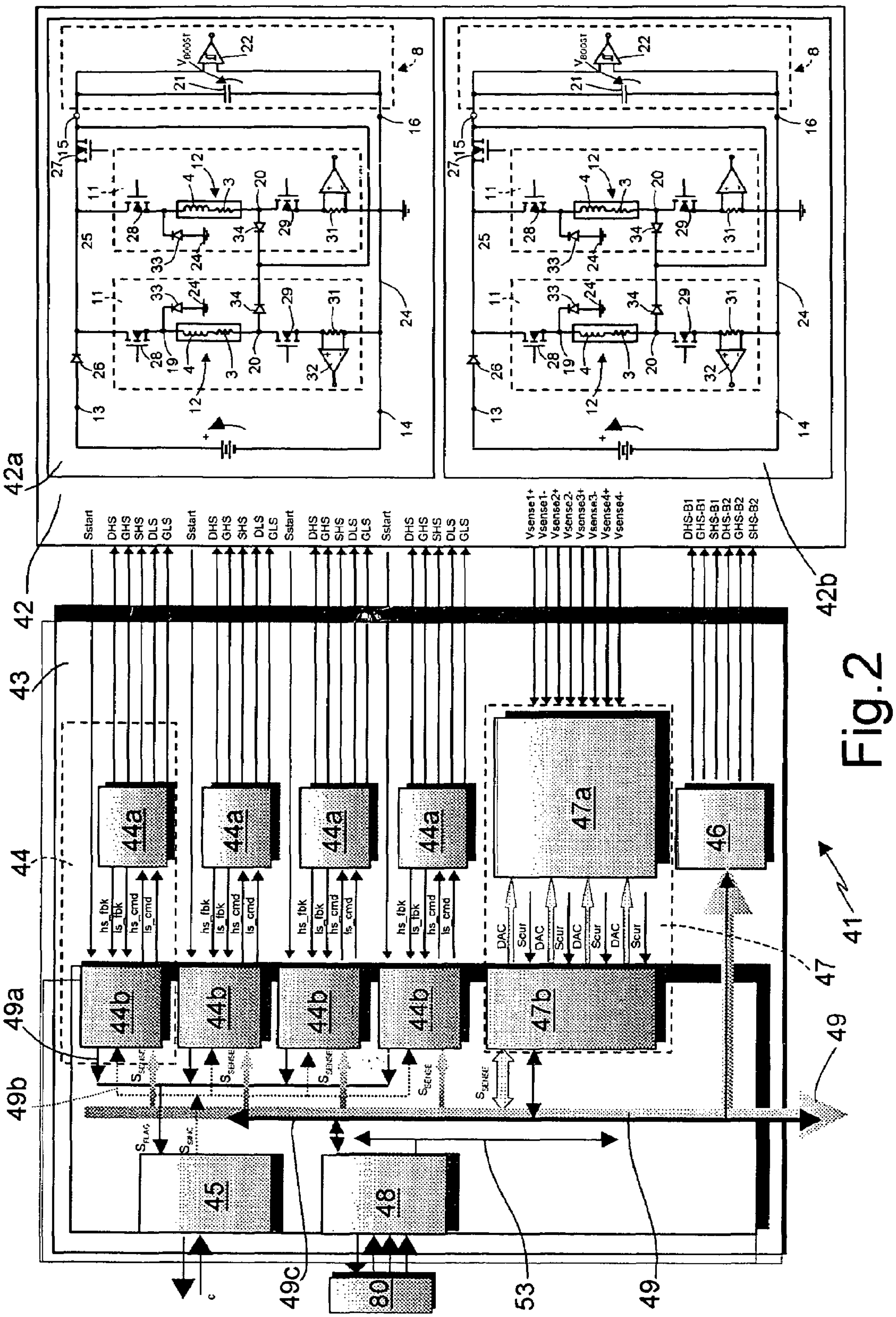
FIG. 2 is a block diagram of a drive device for inductive electroactuators as defined by the present invention.

With reference to FIG. 2, 41 denotes the overall drive device for inductive electroactuators, which essentially comprises a power circuit 42 capable of supplying current to the electroactuators and a control circuit 43 capable of driving the power circuit 42 to regulate the current flowing through each electroactuator, in such a manner that, on the one hand, the current follows a predetermined profile over time, and on the other, the stored energy is transferred from an electrical injector to the capacitor of the voltage boost circuit (in accordance with the energy transfer criterion described above).

As already stated, the present invention is advantageously, but not exclusively, used for driving electrical injectors of a fuel injection system for a motor vehicle internal combustion engine, in particular for a common rail fuel injection system for a diesel engine, to which the following explanation will make explicit reference, without consequently restricting the general scope thereof.

Figure 1:
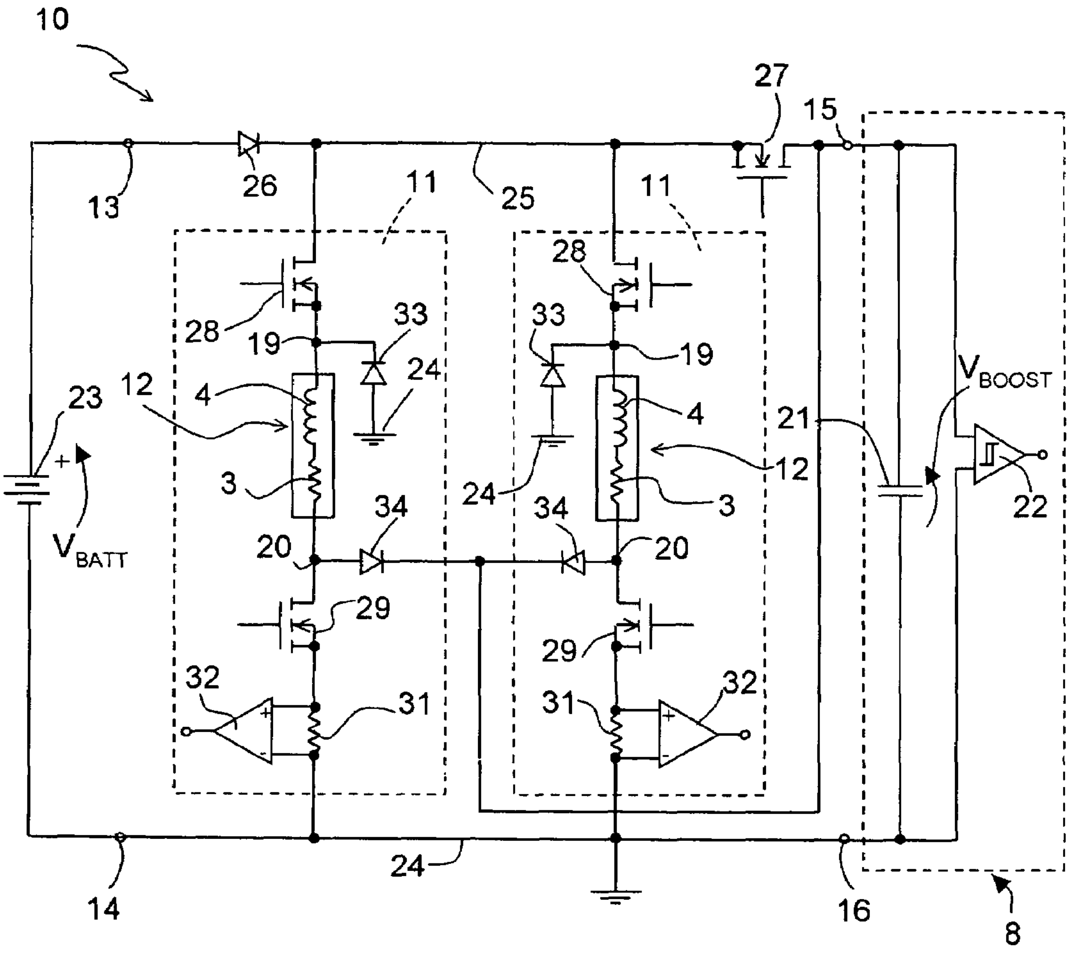
FIG. 1 is a schematic diagram of a power circuit of a drive device for inductive electroactuators according to the prior art.

The power circuit 42 shown schematically in the example of FIG. 2 is capable of controlling current in four electrical injectors 12 and comprises two power blocks 42*a*, 42*b*, each of which is made up of a circuit which is entirely similar to the power circuit 10 for controlling the two electrical injectors shown in FIG. 1, and consequently any elements in common with the power circuit 10 (of FIG. 1) have been assigned the same reference numerals and will accordingly not be described in further detail.

The control circuit 43, however, preferably takes the form of an ASIC-type integrated board (ASIC=Application Specific Integrated Circuit), the architecture or circuit structure of which is shown schematically in FIG. 2, which illustrates an example of a control circuit 43 capable of driving the four drive circuits 11 of power circuit 42, to which the following description will make specific reference without consequently restricting the general scope thereof.

The control circuit 43 essentially comprises: four control blocks 44 (only one of which is shown with a dashed line), one for each electrical injector (i.e. one for each drive circuit 11), a synchronisation block 45, a boost drive block 46, a current measurement block 47, and a communication block 48 capable of interfacing the control board or circuit 43 with one or more external control devices, in particular an external microcontroller 80.

The various electrical blocks 43, 44, 45, 46, 47 and 48 stated above which make up the control circuit 43 are interconnected by means of a control bus 49, this bus being the means not only for exchanging control signals between the blocks themselves but also for exchanging control signals between said blocks and the external control devices, in particular with the external microcontroller 80.

With reference to FIG. 2, the measurement block 47 has the function of detecting, for each electrical injector 12, the voltage $V_S$ supplied by the corresponding sensing stage of the control circuit 11, of converting the analogue voltage signal $V_S$ into the digital signal $S_{SENSE}$ indicating the current flowing in the corresponding sense resistor 31, and, finally, of supplying the latter to a respective control block 44, whereas the communication block 48 manages the communication of control information, data or signals between the various blocks contained in the control circuit 43 and the external microcontroller 80.

In the present case, the communication block 48 is made up of a 16-bit communication interface (SPI interface) capable of effecting preferably synchronous communication and comprising a first control module (not shown) capable of managing the communication requests relating to data read/write operations made by the external microcontroller 80 or by the internal blocks; and a second control module (not shown) having the function of implementing a communication protocol capable of managing the addressing of data in the various memories and/or internal registers to the various blocks of the control circuit 43, in the various read/write operations.

The boost drive block 46, however, has the function of controlling each first MOS transistor 27 of the drive device 41 for controlling the activation of the associated boost device. In the present case, in the example shown in FIG. 2, the boost drive circuit 46 is capable of managing the control of a pair of boost devices, each connected to two drive circuits 11, and is connected on the input side to the control bus 49 in order to receive a series of items of information, on the basis of which it generates the control signals of the first MOS transistors 27 of the boost devices.

The synchronisation block 45 is connected to the control bus 49, from which it receives status signals $S_{FLAG}$ encoding information associated with the operating status of the control blocks 44, and outputs to the said control bus 49 a synchronisation signal $S_{SINC}$ capable of coordinating the drive actions issued by the control blocks 44 to the respective drive circuits 11.

The control blocks 44 are capable of driving the operation of the respective drive circuits 11 and they check the instantaneous operating status of the corresponding electrical injectors 12.

In detail, each control block 44 is capable of receiving the input signal $S_{SENSE}$ which indicates the value of the current flowing in the sense resistor 31 of the respective drive circuit 11; a feedback signal hs_fbk containing a series of items of information relating to the operating status of the second MOS transistor 28 (controlled switch 28 present on the "high side" of the drive circuit 11); and a feedback signal ls_fbk containing a series of items of information relating to the operating status of the third MOS transistor 29 (controlled switch 29 present on the "low side" of the drive circuit 11).

As already stated, each control block 44 is moreover connected to the control bus 49 in order to receive from the latter a signal $S_{SINC}$ encoding a series of items of information capable of permitting the control block 44 itself to synchronise the commands to be issued to the drive circuit 11 with those issued by the other control blocks 44, in accordance with a predetermined common strategy for driving the electrical injectors 12.

Each control block 44 is moreover capable of outputting a control signal hs_cmd to the second MOS transistor 28, a control signal ls_cmd to the third MOS transistor 29, and a status signal $S_{FLAG}$, which contains a series of items of information relating to the operating status of said control block 44, and is capable of being transmitted though the respective control bus 49 to the synchronisation block 45. In the present case, the control block 44 encodes in the status signal $S_{FLAG}$ a plurality of control flags stored in some internal registers (not shown).

As is more clearly shown in FIG. 2, each control block 44 comprises a pair of control stages, the first of which, hereinafter designated 44*a*, takes the form of an analogue circuit connected directly to a corresponding control circuit 11, while the second control stage, hereinafter designated 44*b*, is connected, on the one hand, to the control bus 49, and, on the other, to the first control stage 44*a*, to which it supplies the control signal hs_cmd from the second MOS transistor 28 and the control signal ls_cmd from the third MOS transistor 29.

Specifically, the first control stage 44*a* is provided with a series of output pins or terminals connected to the terminals of the second and third MOS transistor 28 and 29 in order to supply thereto polarisation voltages generated as a function of the control signals hs_cmd and ls_cmd. A first, second and third pin designated by the abbreviations DHS, GHS and SHS are respectively connected to the well, gate and source terminals of the second MOS transistor 29, while the fourth and fifth pin, respectively designated with the abbreviations DLS, GLS, are connected to the corresponding well and gate terminals of the second MOS transistor 29.

The first control stage 44*a* is moreover provided with a circuit for monitoring the "high side" and a circuit for monitoring the "low side" (not shown), said circuits being capable of inputting into the second control stage 44*b* the respective feedback signals hs_fbk and ls_fbk encoding the information relating to the operation of the second and third MOS transistors 28 and 29.

The second control stage 44*b*, however, is capable of receiving as input the feedback signals hs_fbk and ls_fbk from the first control stage 44*a*, and the synchronisation signal $S_{SINC}$, and outputs the status signal $S_{FLAG}$ and the control signals hs_cmd and ls_cmd.

It should be noted that the second control stage 44*b* is moreover capable of supplying, as a function of the feedback signals hs_fbk and ls_fbk, the interrupt request signal to the external microcontroller 80, and a signal encoding a series of data generated by a request transmitted from the external microcontroller 80, and a signal $S_{DAC}$ which sets threshold levels for current quantisation in the comparators of the analogue circuit 47*a*.

Figure 3:
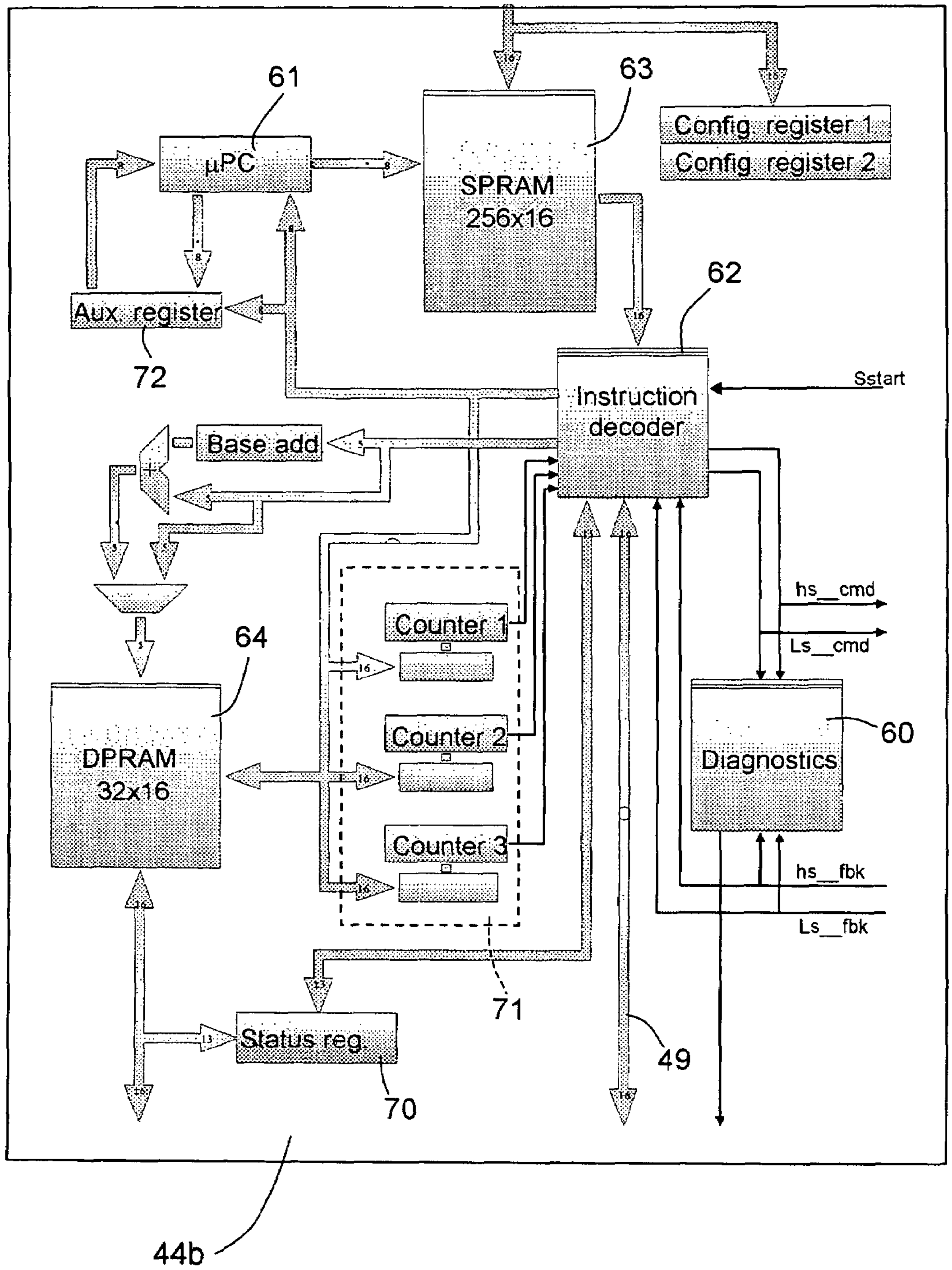
FIG. 3 shows the circuit architecture of a control stage comprised in an electrical injector control block shown in FIG. 2.

FIG. 3 shows an example of the circuit architecture of the second control stage 44*b*, which essentially comprises a diagnostic block 60, a first counter block 61, an internal microcontroller 62, and a main memory 63.

The diagnostic block 60 is capable of carrying out an instantaneous comparison between the output control signals hs_cmd and ls_cmd and the input feedback signals hs_fbk and ls_fbk, in such a manner as to detect any error conditions and then generate, as a function of said error conditions, the interrupt request signal to the internal microcontroller 62 and/or to the external microcontroller 80.

The main memory 63 is capable of storing the program code containing the various instructions to be implemented in the internal microcontroller 62, and is made up of a RAM memory block (256×16) which cooperates with the first counter block 61 which stores the address relating to the instruction to be output to the internal microcontroller 62.

With reference to FIG. 3, the second control stage 44*b* moreover comprises a secondary memory 64 having two memory areas in which are stored the same operating parameters which characterise the operation of the electrical injector 12, and a series of pointer registers 71 which cooperate with the internal microcontroller 62 and with the external microcontroller 80 in order to define access of the internal microcontroller 62 to one memory area and, simultaneously, to define access of the external microcontroller 80 to the other memory area.

The pointer registers 71 are moreover capable of cooperating with the internal microcontroller 62 and with the external microcontroller 80 to swap access rights to the two memory areas between the internal microcontroller 62 and the external microcontroller 80.

In other words, read/write access operations of the secondary memory 64 are organised in such a manner that, when the internal microcontroller 62 accesses one of the two memory areas to read the operating parameters to be used in the ongoing control operations of the electrical injector 12, the external microcontroller 80 can only access the other memory area to carry out write operations (reprogramming or updating) on the operating parameters which will have to be used by the internal microcontroller 62 in the control operations of electrical injector 12 subsequent to the ongoing operations. Obviously, the pointer registers 71 will alternately address the memory area accessible to the external microcontroller 80 and the memory area accessible to the internal microcontroller 62.

Figure 4:
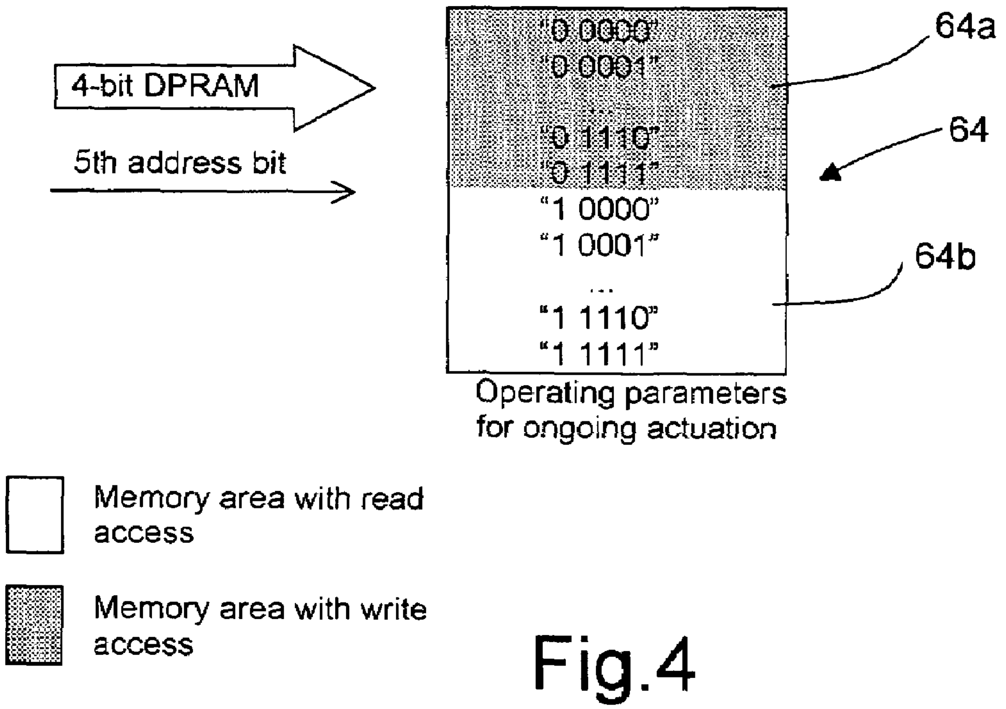
FIGS. 4 and 5 show schematically how access is gained to the data present within a memory in the drive device in two consecutive operating conditions.
Figure 5:
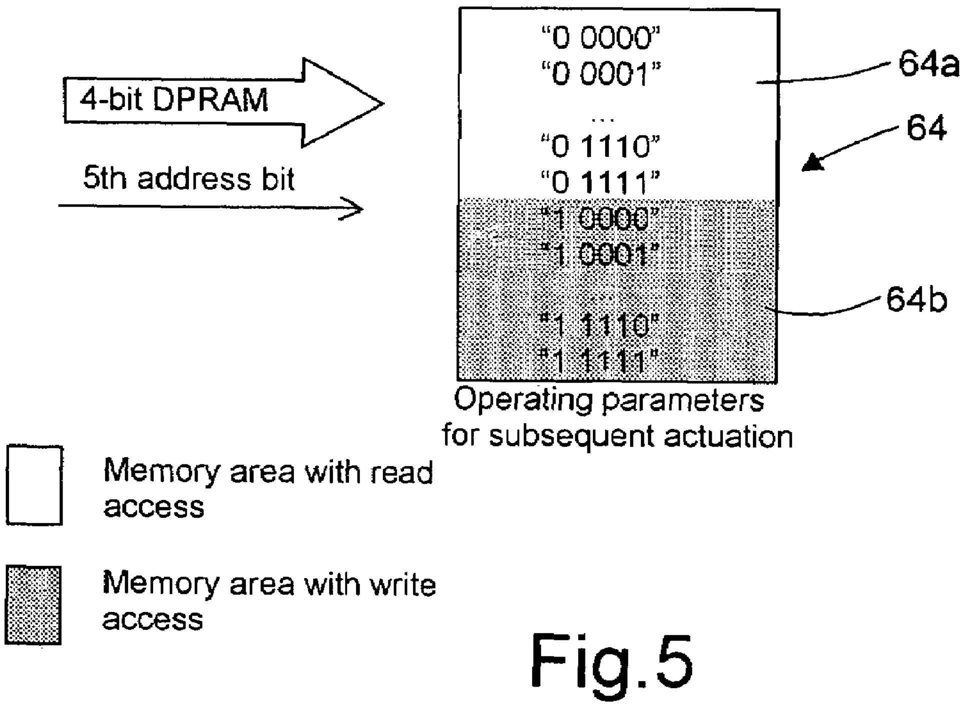

FIGS. 4 and 5 illustrate schematically the subdivision and organisation of the secondary memory 64 in the two memory areas in two consecutive operating phases, in which in the first operating phase (FIG. 4) the pointer registers 71 address a first memory area 64*a* (highlighted in grey) to the external microcontroller 80, and an internal microcontroller 62 to a second memory area 64*b*.

In this case, the first memory area 64*a* is thus only write-accessible to the external microcontroller 80 which overwrites or reprograms the operating parameters, while the second memory area 46*b* (not highlighted) is only read-accessible to the internal microcontroller 62, which accesses the operating parameters stored in said secondary memory area in order to generate control signals hs_cmd and ls_cmd as a function of said operating parameters.

The transition from the first operating phase to the second operating phase takes place when the control block 44 receives a signal $S_{START}$ which indicates the onset of a new actuation of the electrical injector 12 and when the external microcontroller 80 has finished updating the control operating parameters in the first memory area 64*a*.

With reference to FIG. 5 , in the second operating phase the access rights to first and second memory areas 64*a* and 64*b* are swapped, after which the first memory area 64*a* (not highlighted) becomes exclusively accessible to the internal microcontroller 62 which uses the previously modified operating parameters to control the new ongoing operations, while the second memory area 64*b* becomes exclusively accessible to the external microcontroller 80 which reprograms the operating parameters contained therein.

On the basis of the above description, it should be noted that the above-stated swapping of access rights to the two memory areas of the secondary memory 64 eliminates any data write/read conflict conditions between the internal microcontroller 62 and the external microcontroller 80 and advantageously makes it possible to implement a double buffer configuration in which the external microcontroller 80 can program the "new" operating parameters for the subsequent actuation control operations, while the "old" operating parameters remain unchanged, stable and available to the internal microcontroller 62 throughout the ongoing actuation control operations.

Obviously, in this phase the addresses associated to the first and second memory areas are temporarily stored in the respective pointer registers 71, the first pointer register (not shown) being capable of supplying to the internal microcontroller 62 the address of one of the two memory areas alternately assigned as read only, while a second register is capable of alternately supplying to the external microcontroller 80 the address of the other write-assigned memory area.

The secondary memory 64 is preferably made up of a (32×16) DPRAM (Dual Port RAM) module comprising two memory blocks, each of which is capable of storing 16 words, and is connected to an address bus made up of 5 address lines in which four bits are used to address the words and a fifth bit is used to define access to the two memory blocks by the internal microcontroller 44*b* and the external microcontroller 80.

With reference to FIG. 3, the second control stage 44*b* moreover comprises a series of first registers 70 used during data writing/reading in the second memory 64; a multiplexer block (not shown) capable of selecting the data to be stored in the first registers 70; and a second, preferably 8-bit, register (not shown) for storing the current quantisation thresholds of the measurement block 47.

The second control stage 44*b* moreover comprises an auxiliary register 72 used as an auxiliary storage element during the management of the encoded instructions in the main memory 63, for example during execution of conditional or direct jump instructions.

The internal microcontroller 62 has the function of receiving the instructions from the main memory 63, decoding them and executing them in such a manner as to generate the control signals hs_cmd and ls_cmd. In particular, with reference to FIG. 3, the internal microcontroller 62 receives as input the actuation start command signal $S_{START}$ for the electrical injector, the feedback signals hs_fbk and ls_fbk, outputs the control signals hs_cmd and ls_cmd and is connected to the control bus 49 to exchange the control signals.

The operation of the drive device 41 may readily be deduced from the above description and does not require any particular explanation.

The drive device 41 for electrical injectors is extremely advantageous in that the alternation of access rights by the external and internal microcontrollers to the operating parameters contained in the two memory areas of the secondary memory 64 ensures that the commands supplied to the electrical injectors are correctly generated, the commands being based on a set of operating parameters which are homogeneous, i.e. updated in accordance with the true operating conditions of the electroactuators themselves.

Finally, various modifications and variations may obviously be made to the drive device described herein without consequently extending beyond the scope of the present invention.

What is claimed is:

1. A drive device (41) for inductive electroactuators equipped with a power circuit (42) comprising:

a drive circuit (11) for each electroactuator (12); each drive circuit (11) comprising selectively controlled switching means (27, 28, 29) for regulating the current flowing through said electroactuator (12);

a control circuit (43) which is capable of driving the operation of each drive circuit (11) of said power circuit (42);

a series of control modules (44), each of which controls said switching means (27, 28, 29) of an associated drive circuit (11), and comprises memory means (64) having at least two memory areas (64*a*, 64*b*) each storing the same operating parameters for said drive circuits (11); reading means (62) for the operating parameters; and pointer means (71) which cooperate with said reading means and with writing means (80) for the operating parameters in order to define access of said writing means (80) to one of said memory areas (64*a*, 64*b*) and simultaneously to define access of said reading means (62) to the other of said memory areas (64*a*, 64*b*), and to swap the access rights of said writing means (80) and of said reading means (62) to said memory areas (64*a*, 64*b*).

2. A drive device according to claim 1, wherein said pointer means (71) are capable of performing the swap of rights to the memory areas (64*a*, 64*b*) when said writing means (80) have finished updating said operating parameters in one of said memory areas (64*a*, 64*b*).

3. A drive device according to claim 1, wherein said pointer means (71) are capable of performing said swap of access rights on every new actuation of the respective electrical injector (12).

4. A drive device according to claim 1, wherein each said control module (44) supplies a status signal ($S_{FLAG}$) which indicates the operating status of said control module (44); and wherein said control circuit comprises synchronization means (45) capable of receiving and processing said status signals ($S_{FLAG}$) in order to generate a common synchronization signal ($S_{SINC}$) capable of synchronizing said control modules (44) with one another.

5. A drive device according to claim 1, wherein said control circuit (43) comprises communication means (48) capable of managing the communication of information between said control circuit (43) and external control means.

6. A drive device according to claim 1, wherein said control circuit (43) comprises measurement means (47) capable of detecting, for each said electrical injector (12), the current flowing through the said electrical injector (12).

7. A drive device according to claim 1, wherein said power circuit (42) comprises at least one boost device and said switching means (27, 28, 29) comprise at least one first selectively activatable transistor (27) for connecting said boost device to said drive circuits (11) present in said power circuit (42); said control circuit (43) comprising boost drive means (46) capable of controlling said first transistor (27) in such a manner as to control activation of said boost device.

8. A drive device according to claim 1, wherein said switching means (27, 28, 29) of each said drive circuit (11) comprise a second and third selectively activatable transistor (28, 29) for regulating the current flowing in the corresponding electrical injector (12); said drive device (41) being characterized in that each said control module (44) is connected to a respective control circuit (11) to which it supplies a first and a second control signal ($hs_{13}$ cmd, $ls_{13}$ cmd) for controlling respectively the second and the third transistor (28, 29) of said control circuit (11).

9. A drive device according to claim 1, wherein said control circuit (43) is made up of an ASIC-type integrated board.

10. A drive device according to claim 1, wherein said memory means (64) comprise a DPRAM module comprising at least two memory blocks.

* * * * *